United States Patent [19]

Kim et al.

[11] Patent Number: 5,405,910
[45] Date of Patent: Apr. 11, 1995

[54] PROCESS FOR PREPARING ACRYL MODIFIED POLYESTER RESIN FOR USE IN A POWDER COATING AND A POWDER COATING COMPOSITION CONTAINING THE SAME

[75] Inventors: Weon-seok Kim, Incheon; Bong-jin Kim, Seoul, both of Rep. of Korea

[73] Assignee: Korea Chemical Co, Kyunggi-do, Rep. of Korea

[21] Appl. No.: 626,141

[22] Filed: Dec. 12, 1990

[30] Foreign Application Priority Data

Dec. 29, 1989 [KR] Rep. of Korea .................. 20158

[51] Int. Cl.⁶ .................. C08F 8/00; C08L 67/02
[52] U.S. Cl. .................. 525/127; 525/131; 525/176; 528/272; 528/296; 528/303; 528/306
[58] Field of Search .............. 528/272, 306, 303, 296; 525/176, 131, 127

[56] References Cited

U.S. PATENT DOCUMENTS

| | | | |
|---|---|---|---|
| 3,989,767 | 11/1976 | Homma et al. | 525/28 |
| 4,002,700 | 1/1977 | Fukuzaki et al. | 525/49 |
| 4,112,146 | 9/1978 | Lazear | 428/290 |
| 4,379,912 | 4/1983 | Lu | 528/272 |
| 4,499,239 | 2/1985 | Murakami et al. | 525/176 |
| 4,605,710 | 8/1986 | Guilbert | 525/438 |

OTHER PUBLICATIONS

Nikitin, *The Chemistry of Cellulose and Wood*, 1966, (month unavailable) Academy of Science of the USSR.

*Primary Examiner*—John Kight, III
*Assistant Examiner*—Jeffrey Culpeper Mullis
*Attorney, Agent, or Firm*—Lowe, Price, LeBlanc & Becker

[57] ABSTRACT

Acryl modified polyester resins are prepared by a process which comprises reacting an acid mixture with an alcohol mixture to form hydroxyl polyester prepolymers, solution polymerizing acryl monomers with acidic acryl monomers having carboxyl groups to form acryl resins, and reacting said hydroxyl polyester prepolymers with said acryl resins and polycarboxylic acids having at least two carboxyl groups.

A powder coating composition is composed of inorganic pigment or organic pigment, a flowing agent, a curing agent, a curing accelerator, other stabilizers and the acryl modified polyester resins prepared according to the above process.

6 Claims, No Drawings

PROCESS FOR PREPARING ACRYL MODIFIED POLYESTER RESIN FOR USE IN A POWDER COATING AND A POWDER COATING COMPOSITION CONTAINING THE SAME

BACKGROUND OF THE INVENTION

1. Field of the Invention The present invention relates to a process for preparing acryl modified polyester resins for use in powder coatings and also a powder coating composition containing said acryl modified polyester resins. In particular, the present invention provides a process for preparing acryl modified polyester resins by using good characteristics of conventional polyester resins and acryl resins and a powder coating composition by using a triglycidyl isocyanurate (TGIC) as a curing agent.

2. Description of the Prior Art

There are many conventional resins for powder coatings which could be selected in accordance with their uses. When a resistance against weather is required, carboxylated polyesters and the TGIC have been used. In this case, mechanical strength and an adhesive performance are good but stain and chemical resistance are relatively poor when compared with powder coatings which are composed of epoxy resins and poly carboxylic acids or composed of the carboxylated polyester and epoxy resins. Above prior art coatings which use the carboxylated polyesters and the TGIC may also have disadvantages as follows; a) it is difficult to form a smooth surface thereof because of the insufficient flow of the melt, b) poor appearance of the final coated film, and c) the coatings appear to have an orange peel and pin hole phenomena since when they are coated and cured air can not be removed sufficiently. Further, the prior art coatings can improve resistance against weather better than the powder coatings which use the epoxy resins, but cannot provide the good resistance against weather compared with a solution typed acryl coatings or a powder typed acryl coatings.

Therefore, the conventional resins are unsuitable for use in the fields which require good resistance against weather. The conventional acryl typed resin coatings show weather and chemical resistance but require a high cure temperature such as at least above 180° C. A low curing temperature degrades resistance against weather, solvent resistance, a resistance against stain, thermo-resistance and degrades mechanical properties as well due to the insufficient cure. Furthermore, the solvent typed coatings useful for decorative coatings could be prepared into a thin coating having a thickness of 25 to 50 microns, but conventional powder coatings are difficult to make the thin coating. Also, when the solution typed coatings are heated and melted, a low flowage resulting from a high melting viscosity may cause an appearance thereof to be poor.

If one arbitrarily lowers curability in order to improve the flowage, it may be possible to prepare the good appearance but mechanical properties and solvent resistance are degraded. Moreover, when one also prepares a thin coating by means of lowering a viscosity and lowering a softening point, the storage stability of coatings should be degraded due to the blocking thereof during the storage.

SUMMARY OF THE INVENTION

In order to overcome the above disadvantages, it is an object of the present invention to provide a process for acryl modified polyester resins which comprises (1) reacting an acid mixture with an alcohol mixture to form hydroxyl polyester prepolymers, (2) solution-polymerizing monomers with acidic acryl monomers having carboxyl groups to form acryl resins, and (3) reacting the hydroxyl polyester prepolymers with the acryl resins and poly carboxylic acids having at least two carboxyl groups to form acryl modified polyester resins.

It is an another object of this invention to provide a powder coating composition containing the above acryl modified polyester resins which have a good appearance, a solvent resistance, a chemical resistance, a thermo-resistance and a good resistance against weather in proper consideration of the flow characteristrics cross linking reaction rate, melting viscosity and softening point of resins.

Other and further objects of this invention will become obvious upon an understanding of the illustrative embodiments about to be described or will be indicated in the appended claims, and various advantages not referred to herein will occur to one skilled in the art upon employment of the invention in practice.

DETAIL DESCRIPTION OF THE INVENTION

In order to prepare powder coatings which have a good storage stability and a superior flow characteristics, we, inventors, thought that it is very important to select monomers having a low melting viscosity and a high softening point of its polymer, to form acryl resins by polymerizing the monomers and to modify polyester resins by means of adding the acryl resins because conventional polyester resins have some problems. As a result, we prepared powder coatings which enhanced a chemical resistance and a resistance against weather and had the good storage stability.

The present invention comprises the following three steps of the reactions to prepare acryl modified polyester resins; (a) reacting an acid mixture with an alcohol mixture to form hydroxyl polyester prepolymers, (1) solution-polymerizing monomers with acidic acryl monomers having carboxyl groups to form acryl resins, (2) reacting the hydroxyl polyester prepolymers with the acryl resins and poly carboxylic acids having at least two carboxyl groups.

Furthermore, the final powder coatings film having good physical properties are prepared by the acryl modified said polyester resins, curing agent, and other additives.

In detail, the process of this invention comprises (1) reacting an acid mixture with an alcohol mixture to form hydroxyl polyester prepolymers, (2) solution-polymerizing monomers having carboxyl groups to form acryl resins, and (3) reacting the hydroxyl polyester prepolymers with the acryl resins in amounts of 10 to 50 wt % and poly carboxylic acids having at least two carboxyl groups in amounts of 5 to 20 wt % based on the hydroxyl polyester prepolymers to form acryl modified polyester resins which have carboxyl groups of 1 to 3 at the terminal of the final resins, an acid value of 20 to 80, a softening point of 80° to 150° C., a number average molecular weight of 2,000 to 10,000, and a linear or branched structure.

When the said acryl modified polyester resins are used for powder coatings, triglycidyl isocyanurate as a curing agent, pigment, flow agent, and other additives are added to the resins, passed through extruder and crushed to form final powder coatings.

In particular, the polyester resins and the acryl resins must be cautiously mixed in the predetermined ratio. The acryl resins used in the reaction have a higher softening point and better flow characteristics than that of the polyester resins. The compounds composed of the acryl and polyester resins show the characteristics of acryl resins up to the point where some amount of acryl resins are included, but when the amounts of polyester resins are increased in the compounds, the softening point is lowered and the storage stability of coatings is degraded. When the amounts of acryl resins are increased, a bending resistance is decreased and mechanical properties are therefore degraded. Therefore, it is important to balance the characteristics of each resins above to obtain preferable physical properties.

I. A preparation of acryl modified polyester resin

[a] a preparation of hydroxyl polyester prepolymer

Acids and alcohols are selected in consideration of mechanical properties, softening point and flow characteristics. The acids having at least two carboxyl groups can be used solely or in a state of mixture, the alcohols having at least two hydroxyl groups can be also used solely or in a state of mixture. The acids can be one or more than two selected from groups consisting of terephthalic acid, isophthalic acid, dimethyl terephthalate, maleic acid, pyromellitic acid, fumaric acid, tetra hydrophthalic acid, methyl tetra-hydrophthalic acid, hexahydrophthalic acid and their deanhydrides, adipic acid, sebacic acid, succinic acid, azelaic acid, pyromellitic dianhydride, pivalic acid, and cyclo hexadicarboxyl acid.

In order to make film coatings smooth and glossy, the acids having long chains in the structure are preferable. The preferable acid compounds comprise para-aromatic dicarboxylic acids in amounts of 60 to 95 wt % including terephthalic acid or dimethyl terephthalate, ortho or meta-aromatic acids in amounts of 1 to 20 wt %, acids having at least three carboxyl groups in amounts of 0 to 5 wt %, and linear or cyclo aliphatic dicarboxylic acids having 2 to 12 carbons in amounts of 1 to 20 wt %.

The para-aromatic dicarboxylic acids play the role of maintaining a basic structure of the polyester resins. However, when the para-aromatic dicarboxylic acids are used in an amount of less than 60 wt %, the mechanical strength is degraded. When these are used in an amount of more than 95 wt %, the mechanical hardness is very high.

The ortho or meta-aromatic dicarboxylic acids endow properties of toughness and hardness to the resins. When used in an amount of more than 20 wt %, it is impossible to provide the required hardness. When the acids having at least three carboxyl groups are used in an amount of more than 5 wt %, branched molecular structures are produced more than required so that the flows may be degraded and the appearance may be poor.

When linear aliphatic acids, which influence the flow of and smoothness of film coatings, are used in an amount of more than 20 wt %, the softening point is so low that the storage stability of coatings can be poor.

The preferable alcohol compounds which will react with above acid compounds comprise neopentyl glycol (NPG) in amounts of 50 to 90 wt % and one or more than two polyalcohol in amounts of 10 to 50 wt %. For examples, diethylene glycol, ethylene glycol, propylene glycol, 1,3-butanediol, 1,4-butanediol, 1,6-hexanediol, isopentyl glycol, bis-hydroxy ethylterephthalate, hydrogenated bisphenol A, 1,4-cyclohexane dimethanol, ethylene oxide adduct of hydrogenated bisphenol A, propylene oxide adduct of hydrogenated bisphenol A, tri-ethylol ethane, tri-methanol propane, glycerol, pentaerisritol, 2,2,4-trimethylpentane-1,3-diol and cyclohexane dimethanol can be used.

The alcohol compounds are reacted with the acid coumpounds in the equivalent weight ratio of 1.1:1 to 1.5:1 in the presence of metal contained esterification catalyst of 0.05 to 0.2 wt % based on the total compounds with increasing a temperature up to 245° C. and then the reaction is terminated when the condensate water is no longer produced. The prepolymers formed has a number average molecular weight of 600 to 3000, a hydroxyl value of 20 to 200 mg KOH/g, average hydroxyl groups of 1 to 2.5 at the terminal of the prepolymer and branched or linear structure.

When a number average molecular weight is less than 600, the softening point is so low that the storage stability is degraded. When it is more than 3000, plastic ability is so low that the appearance of film coatings and mechanical properties may be degraded due to the high melting viscosity.

[b] A preparation of acryl resin

We, inventors, selected the acryl resins having an acid value of 10 to 150 mg KOH/g, an average number of carboxyl groups of 1 to 2.5 at the terminal and an average molecular weight of 500 to 3000. When the average number of carboxyl groups is less than 1.0, the effects according to the addition of acryl resins are very small. When the average number of carboxyl groups is more than 2.5, the desired resins cannot be obtained because the molecular weight is unnecessarily over-increased and because the appearance of film coatings is degraded due to the high melting viscosity.

The most preferable average number of carboxyl groups is about 1.2 to 8.

Monomers that can be used in the present invention in order to prepare the acryl resin can be classified by following formulas (a) and (b), and group (c);

wherein $R_1$ is hydrogen atom or methyl group and $R_2$ is one selected from alkyl groups having 1 to 14 carbon atoms or mixture thereof.

The preferable acrylic acid ester monomer is one selected from the group consisting of methyl acrylate, ethyl acrylate, propyl acrylate, n-butyl acrylate, isobutyl acrylate, t-butyl acrylate, 2-methyl hexyl acrylate, lauryl acrylate, methyl methacrylate, ethyl methacrylate, propyl methacrylate, n-butyl methacrylate, isobutyl methacrylate, t-butyl methacrylate, 2-ethyl hexyl methacrylate, lauryl methacrylate, cyclohexyl acrylate, cyclohexyl methacrylate, cellosolve methacrylate, 2-hydroxyl methacrylate, 2-hydroxyl propyl acrylate, 2-hydroxyl propyl methacrylate or mixtures thereof. The most desirable acryl monomer is one selected from the group consisting of methyl acrylate, ethyl acrylate, cyclohexyl acrylate, methyl methacrylate, ethyl methacrylate, n-butyl methacrylate, iso-butyl methacrylate, 2-ethyl hexyl methacrylate, cellosolve methacrylate, 2-hydroxyl ethyl methacrylate and lauryl methacrylate or mixtures thereof.

The adequate amount of the above acryl monomers is about 50 to 90 wt % based on the total acryl monomers. The acryl monomers should be used in an amount of more than 50 wt % in order to enhance an adhesion and have basic physical properties. When the monomers is used in an amount of more than 90 wt %, the film coating is to be unnecessarily rigid and the appearance of film coatings can be therefore degraded. The most desirable amount is about 60 to 80 wt % based on the total acryl monomers.

Among those monomers, the monomers having hydroxyl groups are used for dispersion effects of pigment during the preparation of the coatings and enhancement of compatibility. The monomers are used in an amount of less than 5 wt %. Metha-acryl system among the above monomers, preferably methyl methaacrylate and cellosolve metha-acrylate, should be used because of a good compatibility with polyester resins.

When the methyl metha-acrylate or cellosolve metha-acrylate is used in an amount of more than 50 wt %, preferably more than 65 wt %, the film coating has an excellent gloss clearance. The acryl monomers having long chained alkyl groups can be to enhance the compatibility, to reduce cretaring phenomena, and to make surface of the film coating more smoothness, compared with the acryl monomers having short chained alkyl groups.

(b) Aromatic vinyl compounds.

The desirable weight of the above groups is about 0 to 25 wt % based on the total acryl monomers. These monomers are used for the control of physical properties of acryl resins and the control of price, but a resistance against weather will be degraded when these monomers are used more than 25 wt %. The most adequate range of weights is about 0 to 15 wt %. The available monomers among the above groups are monomers such as α-methyl styrene, styrene, and vinyl toluene and normally the monomers are used as single component or mixture thereof.

(c) Monomers such as acrylic acid and methacrylic acid, the dicarboxylic acids such as maleic acid, fumaric acid and itaconic acid, and carboxylic anhydrides such as maleic anhydride are used in amounts of 5 to 25 wt % based on the total acryl monomers. When the monomers are used in an amount of less than 5 wt %, there will be a little effects of modification of acryl resins with polyester resins and furthermore the unreacted acryl resins will behave as a plasticizer and mechanical properties are therefore degraded. When the monomers are used in amounts of more than 25 wt %, the linkage density of polyester resins with the acrylic resins is increased and the appearance of film coatings will be poor wholly due to the increased melting viscosity.

These monomers improve resistance against weather, a hardness and a resistance against stain. The most preferable weight of the arcyl monomers is 5 to 20 wt % based on the total acryl monomers.

There are many processes to prepare the acryl resins, but a solution polymerization is mostly used and appropriate. There are two kinds of initiators; one is azo compounds such as azo-bis-iso butylo nitrile and azo-bis-dimethylvaleronitrile, and the other is peroxide organics such as benzoyl peroxide, t-butylhydroxide, t-butyl peroxybenzoate, di-t-butylperoxide, cumene hydroperoxide, dicumyl peroxide, and lauryl peroxide.

As a solvent, aliphatic or aromatic hydrocarbon solvents can be used. The reaction is proceeded at a reflux temperature. The resulting resins are depressured at below 30 mmHg to eliminate the solvents and to form final resins.

In order to prevent an unnecessary increase of molecular weight, mercaptan compounds such as n-butylmercaptan, n-amyl mercaptan, n-dodecylmercaptan, t-butylmercaptan, and 3-epoxypropylmercaptan are used for the control of polymerization.

[c] A preparation of the acryl modified polyester resins

The hydroxyl polyester prepolymer prepared by the step [a] is reacted with the acryl resins prepared by the step [b] in amounts of 10 to 50 wt % and polyacid compounds having at least two carboxyl groups in amounts of 5 to 20 wt % based on the polyester prepolymer. The reaction temperature is increased gradually to 230° C. and the reaction continues until the formation of condensate water ceases. Acryl modified polyester resins having average carboxyl groups of 1 to 3, an acid value of 20 to 80 mg KOH/g, a softening point of 80° to 150° C. and a number average molecular weight of 2000 to 10000 are prepared.

The polyacid compounds as mentioned above comprise aromatic acids having at least three carboxyl groups in amounts of 20 to 60 wt %, ortho or meta-aromatic dicarboxylic acid in amounts of 20 to 40 wt %, and linear aliphatic acid in amounts of 10 to 40 wt %.

When the aromatic polycarboxylic acids having at least three carboxyl groups are used in an amount of less than 20 wt %, the desired number of carboxyl groups in the final resins can not be obtained and the cross linkage density in the final coatings is so low that physical properties can be degraded. When the polycarboxylic acids are used in an amount of more than 60 wt %, the molecular weight of the final polymers is so large that the appearance of film coatings may be poor, a flow of coatings may be degraded, and blister or pin holes phenomena may occur.

When the linear or cyclo aliphatic acids are used in an amount of less than 10 wt %, the flexibility of the film coatings is degraded and the bending resistance is thereby poor. Therefore, mechanical properties are degraded. When these are used in an amount of more than 40 wt %, the hardness of film coatings is degraded.

When the acryl resins in an amount of less than 10 wt % are modified with the polyester resins, the characteristics of the acryl resins cannot be provided in the final resins and the molecular weight thereof is so small that the mechanical properties of film coatings can be degraded. When the acryl resins are used in an amount of more than 50 wt %, the hardness of film coatings is increased but mechanical properties of the film coatings are degraded and the molecular weight is so increased that the flows of coatings and the appearance of film coatings may be degraded. The most preferable amount of acryl resins is about 15 to 40 wt % based on the polyester resins.

II. A preparation of powder coating composition

The powder coating composition is prepared by the typical method of the reactions of the acryl modified polyester resins with triglycidyl isocyanurate as a curing agent. In particular, an equivalent weight ratio of the acryl modified polyester resins to the curing agent is about 0.8 to 1.2, preferably 0.9 to 1.1. When the ratio is less than 0.8, the curing reaction does not be proceeded sufficiently and mechanical properties and solvent resistance are therefore poor. When the ratio is larger than 1.2, the appearance of film coatings is poor and mechanical properties are degraded.

The powder coating composition prepared using the resins of the present invention also includes an inorganic pigment or organic pigment, flowing agents, a curing accelerator and other stabilizers. A process for preparing the powder coating composition is known to one skilled in the art of this invention.

Ammonium salts such as trimethyl benzyl ammonium bromide, tertiary amines, organic tin compounds such as triphenyl tin chloride and dibutyl tin laurate can be used for the curing accelerator.

The characteristics of the powder coating composition prepared by the step I and step II are presented in the following (1), (2), and (3) in details.

(1) Even thought the curing conditon such as at 150° C. for 30 minutes or at 160° C. for 20 minutes, which is a lower temperature and shorter curing time than the prior art of the carboxyl polyester-epoxy system or the acryl system, the same mechanical properties such as impact resistance, bending resistance and Erichsen as the epoxy system coatings can be provided. With respect to thermo-resistance and resistance against weather, the present invention is superior to the prior art polyester-triglycidyl isocyanurate system.

(2) The copolymers of linear polyester resins and acryl resins, which are modified by the acryl resins in amounts of 10 to 50 wt % have almost the same softening point as that of acryl resins themselves. The copolymers have a low melting viscosity, a good storage stability even at 35° to 40° C., excellent flows, and an excellent gloss and smoothness on the film coatings.

(3) The resins have good flow characteristics and low melting viscosity. Therefore the coatings can be cured in thin films of 25 to 50 microns with storage stability. In addition, physical properties are good and the appearance and gloss are excellent.

The following EXAMPLES provide a detailed explanation of the present invention but these do not limit the scope of the present invention.

EXAMPLE 1

(Hydroxyl Polyester Resins 1 (HPR-1))

The acid compounds consisting of 1500 g of terephthalic acid, 100 g of isophthalic acid, and 80 g of adipic acid, and the alcohol compounds consisting of 160 g of ethylene glycol and 1200 g of neopentyl glycol were reacted with 2 g of dibutyl tin oxide in the presence of nitrogen. This reaction was continued up to 230° C. while increasing the temperature gradually until the condensation of water no longer formed. Hydroxyl polyester resins having a number average molecular weight of 1200 and a hydroxyl value of 65 are formed.

EXAMPLE 2

(Hydroxyl Polyester Resins 2 (HPR-2))

2000 g of dimethyl terephthalate and 1550 g of neopentyl glycol were reacted with 330 g of ethylene glycol in the presence of 1.1 g of zinc acetate as a catalyst with increasing a temperature gradually and removing methanols up to 210° C. After that, the reaction temperature was cooled down to 120° C. and 50 g of succinic acid, 22 g of trimellitic anhydride and 150 g of isophthalic acid were added and reacted with 2.2 g of dimethyl tin oxide while increasing the temperature up to 230° C. to produce hydroxyl polyester resins having a number average molecular weight of 1500 and a hydroxyl value of 52.

EXAMPLE 3

(Hydroxyl Polyester Resin 3 (HPR-3))

1630 g of dimethyl terephthalate, 120 g of 1,4-butanediol, 101 g of trimethylol propane and 260 g of ethylene glycol were reacted with 1305 g of neopentyl glycol in the presence of zinc acetate of 2.5 g as an ester-exchange reactive catalyst while increasing the temperature gradually up to 210° C. and removing methanols.

After then, the reaction temperature was cooled down to 120° C. and 350 g of sebacic acid and 800 g of isophthalic acid are added and reacted in the presence of 2.1 g of dibutyl tin oxide as a catalyst while increasing the temperature gradually up to 230° C. to produce hydroxyl polyester resins having a number average molecular weight of 1700 and a hydroxyl value of 45.

EXAMPLE 4

(Hydroxyl Polyester Resin 4 (HPR-4))

2005 g or terephthalic acid, 210 g of isophthalic acid, 230 g of adipic acid, 95 g of azelaic acid, 1609 g of neopentyl glycol, 145 g of cyclohexane dimethanol and 152 g of ethylene glycol were reacted in the presence of dibutyl tin oxide of 1.9 g while increasing the temperature gradually up to 230° C. to produce hydroxyl polyester resins having a number average molecular weight of 1400 and a hydroxyl value of 55.

EXAMPLE 5

(Acryl Resins (AR-1))

460 g of methyl methacrylate, 168 g of n-butyl acrylate, 190 g of styrene, 110 g of methacrylic acid, 63 g of n-butyl methacrylate, and 4.5 g of benzoyl peroxide as a polymerization initiator were dropped in solvents consisting of 920 g of toluene and 200 g of butanol during three hours. The reactants were polymerized at reflux temperature for 2 hours. 1 g of benzoyl peroxide melted in 50 g of toluene were added to the resulting reactants. The reaction was maintained for 2 hours. 1 g of benzoyl peroxide melted in 50 g of toluene were added again to the reactants and the reaction was maintained for 3 hours. When the temperature was 170° C., the solvents including toluene were removed under the pressure of less than 30 mmHg to produce acryl resins having an acid value of 70 mg KOH/g and a number-average molecular weight of 1100.

EXAMPLE 6

(Acryl resins (AR-2))

400 g of methyl methacrylate of 400 g, 303 g of ethyl hexylacrylate, 210 g of ethyl acrylate, 163 g of acrylic acid, vinyl toluene of 150 g, 5.5 g of benzyl peroxide as a chain transfer and 3.5 g of n-dodecyl mercaptan as a polymerization controller were dropped in 1500 g of toluene for three hours. The same other reactions as EXAMPLE 5 above then followed to produce acryl resins having an acid value of 89 mg KOH/g and a number-average molecular weight of 950.

EXAMPLE 7

(Acryl resins 3(AR-3))

550 g of cellosolve methacrylate, 200 g of ethyl acrylate, 150 g of styrene monomers, 210 g of acrylic acid, 34 g of hydroxyl ethylacrylate, 3.5 g of benzyl peroxide, and 2.4 g of n-dodecyl mercaptan were mixed and were dropped in 1600 g of toluene for 3 hours. The same other reactions as EXAMPLE 5 followed to produce acryl resins having an acid value of 76 mg KOH/g and a number-average molecular weight of 1050.

EXAMPLE 8

(Acryl resin 4(AR-4))

650 g of methyl methacrylate, 460 g of butyl acrylate, 110 g of styrene monomers, 120 g of ethylacrylate, 250 g of methacrylic acid, 6.1 g of benzoyl peroxide, and 3.0 g of n-dodecyl mercaptan were mixed and were dropped in 1500 g of toluene for 3 hours. The same other reactions as EXAMPLE 5 followed to produce acryl resins having a number-average molecular weight of 790 g and an acid value of 115 mg KOH/g.

EXAMPLE 9-16

The acryl modified polyester resins were prepared by the aforementioned reactions of the polyester resins prepared by the EXAMPLES 1 to 4 with the acryl resins prepared by EXAMPLE 5 to 8 and polyacids described in TABLE 1.

As a catalyst, 0.7 g of dibutyl tin oxide was used and the reaction temperature was gradually increased in the range of 165° C. to 230° C. until water condensation ceased to prepare the desired final resins.

Physical properties of acryl modified polyester resins prepared by the above procedures were described in TABLE 2.

TABLE 1

COMPOSITIONS OF ACRYL MODIFIED POLYESTER RESINS

| | EXAMPLE NO. | | | | | | | |
|---|---|---|---|---|---|---|---|---|
| | 9 | 10 | 11 | 12 | 13 | 14 | 15 | 16 |
| polyester resin | HPR-L 1000 g | HPR-L 100 g | HPR-L 1000 g | HPR-2 1000 g | HPR-3 1000 g | HPR-3 1000 g | HPR-4 1000 g | HPR-4 100 g |
| Acryl resin | AR-1 360 g | AR-2 280 g | AR-4 210 g | AR-3 310 g | AR-1 370 g | AR-4 210 g | AR-2 280 g | AR-3 310 g |
| Trimelltic anhydride | 51 g | 45 g | 41 g | 35 g | 60 g | 55 g | 40 g | 50 g |
| Isophthalic acid | 31 g | 25 g | 21 g | 40 g | 21 g | 20 g | 37 g | 30 g |
| Adipic acid | 20 g | 33 g | 50 g | 45 g | 25 g | 30 g | 26 g | 20 g |
| Sebacic acid | — | — | — | — | 10 g | — | 10 g | — |
| Cyclohexa dicarboxyl acid | — | 10 g | — | — | — | — | 10 g | — |

TABLE 2

PROPERTIES OF ACRYL MODIFIED POLYESTER RESIN

| | EXAMPLE NO. | | | | | | | |
|---|---|---|---|---|---|---|---|---|
| | 9 | 10 | 11 | 12 | 13 | 14 | 15 | 16 |
| Number-Average molecular weight | 3600 | 3700 | 3350 | 3000 | 4500 | 4400 | 3100 | 3900 |
| Acid value (mgKOH/g) | 35 | 42 | 31 | 39 | 30 | 33 | 45 | 51 |
| Softening point (°C.) Mettler FP83, 2° C./min | 125 | 125.5 | 122 | 120 | 126 | 126.3 | 121.3 | 121 |

The powder coatings were prepared by the conventional process after being mixied in each amount described in TABLE 3. The powder coatings were coated on steel plates which were pretreated by zinc phosphate and had a thickness of 0.7 mm, and were cured at 160° C. for 20 minutes to prepare thin films having a thickness of 50 ±5 microns.

TABLE 3

POWDER COATING COMPOSITIONS
(unit : weight parts)

| | EXAMPLE NO. | | | | | | | |
|---|---|---|---|---|---|---|---|---|
| | 9 | 10 | 11 | 12 | 13 | 14 | 15 | 16 |
| Amount of resins | 560 | 500 | 560 | 530 | 560 | 560 | 480 | 450 |
| Tri-glycidyl isocyanurate(1) | 40 | 40 | 40 | 40 | 40 | 40 | 40 | 40 |
| Titanium-dioxide | 390 | 380 | 390 | 390 | 390 | 390 | 370 | 370 |
| Benzoic acid | 2.5 | 2.5 | 2.5 | 2.5 | 2.5 | 2.5 | 2.5 | 2.5 |
| Modaflow(2) | 5 | 5 | 5 | 5 | 5 | 5 | 5 | 5 |
| Tinuvin(3) | 1.0 | 1.0 | 1.0 | 1.0 | 1.0 | 1.0 | 1.0 | 1.0 |

Note
(1) is L1203.5 (trademark) manufactured by GRILONIT CO., Ltd.
(2) is manufactured by MONSANTO company.
(3) is manufactured by CIBA GAIGY A.G.

COMPARATIVE EXAMPLE 1

(Carboxyl Polyester Resins I(CPR-1).

The acid mixture consisting of 1350 g of terephthalic acid, 120 g of isophthalic acid and 50 g of adipic acid was reacted with the alcohol mixture consisting of 1300 g of neopentyl glycol and 310 g of ethylene glycol in the presence of 1.9 g of dibutyl tin oxide as a catalyst while increasing the temperature up to 230° C. gradually to prepare a prepolymer. The prepolymer was reacted with 120 g of trimellitic anhydride and 65 g of isophthalic acid to form carboxyl polyester resins having carboxyl groups at the terminal, a number-average molecular weight of 3900, an acid value of 29 mg KOH/g, and an softening point of 126° C.

COMPARATIVE EXAMPLE 2

(Carboxyl Polyester Resins(CPR-2)

The acid mixture consisting of 1650 g of terephthalic acid and 220 g of isophthalic acid was reacted with the alcohol mixture consisting of 1400 g of neopentyl glycol, 70 g of 1,6-hexanediol and 230 g of propylene glycol in the presence of 2.5 g of dibutyl tin oxide as a catalyst while increasing the temperature up to 230° C. to form a prepolymer. The prepolymer was reacted with 225 g of trimellic anhydride to prepare carboxyl polyester resins having a number-average molecular weight of 4500, an acidic value of 36 mg KOH/g, and a softening point of 127.5° C.

COMPARATIVE EXAMPLE 3

(Carboxyl Polyester Resins 3(CPR-3))

1400 g of dimethyl terephthlate, 600 g of diethylene glycol, 960 g of neopentyl glycol and 1.8 g of zinc acetate were reacted while increasing the temperature up to 210° C. gradually and with removal of methanols. The resulting reactants were reacted with 150 g of isophthalic acid and 50 g of adipic acid while increasing the temperature up to 230° C. The resulting reactants were reacted with 155 g of trimellitic anhydride and 110 g of adipic acid to prepare carboxyl polyester resins having a number-average molecular weight of 3500, an acid value of 42 mg KOH/g, and a softening point of 119.1° C.

The CPR-1 was used to form a powder coating composition according to the same mixing method as EXAMPLE 13 above. The CPR-2 was used to form a powder coating composition in accordance with the same method as EXAMPLE 9 above.

The CPR-3 was used to form a powder coating composition according to the same mixing method as EXAMPLE 10. Furthermore, the above powder coating compositions were coated and cured according to the same methods as EXAMPLES 9 to 16 above. Physical properties of film coatings prepared by above EXAMPLES and COMPARATIVE EXAMPLES were described in TABLE 4.

TABLE 4

| | EXAMPLE NO | | | | | | | | comparative ex. | | |
|---|---|---|---|---|---|---|---|---|---|---|---|
| | 9 | 10 | 11 | 12 | 13 | 14 | 15 | 16 | 1 | 2 | 3 |
| Appearance | good | good | good | good | bad | good | good | good | worse | worse | good |
| Gloss (60°) | 95 | 93 | 92 | 94 | 91 | 95 | 96 | 93 | 90 | 85 | 91 |
| Impact resistance (500 g × ½ φ) | >50 | 50 | 50 | >50 | 50 | 50 | 50 | 50 | 45 | 40 | >50 |
| Erichsen test (mm) | >7 | >7 | >7 | >7 | 7 | >7 | >7 | >7 | 5 | 4 | >7 |
| Bending resistance (180°, φ = 8) | good | good | good | good | bad | good | good | good | worse | worse | worse |
| pencil hardness | H | H | 2H | H | 2H | H | H | 2H | H | 2H | F |
| Storage stability (40° C. × 7 days) | good | good | good | good | good | good | good | good | good | good | worse |
| Solvent resistance (xylene × 24 hours immersion) | good | good | good | good | good | good | good | good | worse | good | worse |
| Alkali resistance (5% NaOH, 500 hours immersion) | good | good | good | good | good | good | good | good | worse | bad | worse |
| Resistance against stain (5% NaCl × 500 hours) | good | good | good | good | good | good | good | good | worse | bad | worse |
| Resistance against weather (%) (after 500 hours, QUV) | 98 | 95 | 98 | 98 | 98 | 98 | 92 | 92 | 85 | 83 | 87 |
| Heat resistance (ΔE) (210° C., after 1 hour) | 0.5 | 0.61 | 0.79 | 0.45 | 0.71 | 0.51 | 0.39 | 0.55 | 1.21 | 1.79 | 1.82 |
| Resistance against U.V. - (ΔE) (after 72 hours) | 1.09 | 1.1 | 1.21 | 1.15 | 0.95 | 0.85 | 0.80 | 1.1 | 1.55 | 2.42 | 1.95 |
| Resistance against acid (50% H$_2$SO$_4$, after 500 hours immersion) | good | good | good | good | good | good | good | good | good | worse | worse |

From the above TABLE 4, the resins of this invention are found to be superior to the comparative resins with regard to physical properties.

As many apparently widely different embodiments of this invention may be made without departing from the spirit and scope thereof, it is to be understood that the invention is not limited to the specific embodiments thereof except as defined in the appended claims.

We claim:

1. A powder coating composition comprising:
   inorganic pigment or organic pigment, a flowing agent, a curing agent, a curing accelerator and acryl modified polyester resins prepared by:
   (1) reacting an acid having at least two carboxyl groups, solely or in a state of mixture with other acids having at least two carboxyl groups with an alcohol having at least two hydroxyl groups, solely or in a state of mixture with other alcohols having at least two hydroxyl groups, to form hydroxyl polyester prepolymers; and
   (2) solution polymerizing monomers selected from groups (a), (b) and (c), consisting of (a) acrylic acid esters, (b) aromatic vinyl compounds, and (c) unsaturated carboxylic acids, unsaturated dicarboxylic acids and unsaturated carboxylic anhydrides; with acidic acryl monomers having carboxyl groups to form acryl resins; and
   (3) reacting said hydroxyl polyester prepolymers with said acryl resins and polycarboxylic acids having at least two carboxyl groups to form said acryl modified polyester resins.

2. A power coating composition of claim 1 wherein triglycidyl isocyanurate is used as a curing agent and an equivalent weight ratio of said curing agent to said acryl modified polyester resins is in the range of 0.9 to 1.1.

3. The powder coating composition according to claim 1, wherein step (3) comprises reacting said hydroxyl polyester prepolymers with said acryl resins and said polycarboxylic acids at a temperature in the range of 165° C. to 230° C. for a period of time until water condensation ceases.

4. A powder coating composition consisting essentially of acryl modified polyester resins prepared by:
   (1) reacting an acid having at least two carboxyl groups, solely or in a state of mixture with other acids having at least two carboxyl groups with an alcohol having at least two hydroxyl groups, solely or in a state of mixture with other alcohols having at least two hydroxyl groups, to form hydroxyl polyester prepolymers; and
   (2) solution polymerizing monomers selected from groups (a), (b) and (c), consisting of (a) acrylic acid esters, (b) aromatic vinyl compounds, and (c) unsaturated carboxylic acids, unsaturated dicarboxylic acids and unsaturated carboxylic anhydrides; with acidic acryl monomers having carboxyl groups to form acryl resins; and
   (3) reacting said hydroxyl polyester prepolymers with said acryl resins and polycarboxylic acids having at least two carboxyl groups to form said acryl modified polyester resins; and
   (4) optionally adding one or more of the following selected from the group consisting of inorganic pigments or organic pigments, flowing agents, curing agents and curing accelerators; and
   (5) crushing the mixture in step (4) to form a powder.

5. The powder coating composition according to claim 4, wherein step (3) comprises reacting said hydroxyl polyester prepolymers with said acryl resins and said polycarboxylic acids at a temperature in the range of 165° C. to 230° C. for a period of time until water condensation ceases.

6. A process for preparing a powder coating composition comprising acryl modified polyester resins, the process comprising:
   (1) reacting an acid having at least two carboxyl groups, solely or in a state of mixture with other acids having at least two carboxyl groups with an alcohol having at least two hydroxyl groups, solely or in a state of mixture with other alcohols having at least two hydroxyl groups, to form hydroxyl polyester prepolymers;
   (2) solution polymerizing monomers selected from groups (a), (b) and (c), consisting of (a) acrylic acid esters, (b) aromatic vinyl compounds, and (c) unsaturated carboxylic anhydrides; with acidic acryl monomers having carboxyl groups to form acryl resins;
   (3) reacting said hydroxyl polyester prepolymers with said acyl resins and polycarboxylic acids having at least two carboxyl groups to form said acryl modified polyester resins;
   (4) optionally adding one or more of the following selected from the group consisting of inorganic pigments or organic pigments, flowing agents, curing agents and curing accelerators; and
   (5) crushing the mixture in step (4) to form a powder.

* * * * *